(12) United States Patent
Stanton et al.

(10) Patent No.: US 7,494,633 B2
(45) Date of Patent: Feb. 24, 2009

(54) GAS ABATEMENT

(75) Inventors: Gareth David Stanton, Clevedon (GB);
Andrew James Seeley, Bristol (GB);
James Robert Smith, Taunton (GB)

(73) Assignee: Edwards Limited, Crawley, West Sussex (GB)

( * ) Notice: Subject to any disclaimer, the term of this patent is extended or adjusted under 35 U.S.C. 154(b) by 215 days.

(21) Appl. No.: 11/659,641

(22) PCT Filed: Aug. 2, 2005

(86) PCT No.: PCT/GB2005/003033
§ 371 (c)(1),
(2), (4) Date: Feb. 5, 2007

(87) PCT Pub. No.: WO2006/013355
PCT Pub. Date: Feb. 9, 2006

(65) Prior Publication Data
US 2007/0217983 A1    Sep. 20, 2007

(30) Foreign Application Priority Data
Aug. 4, 2004  (GB) ................... 0417378.7

(51) Int. Cl.
*B01D 53/34* (2006.01)
*B01D 53/58* (2006.01)
*B01D 53/68* (2006.01)
*B01D 53/72* (2006.01)
*B01D 53/74* (2006.01)

(52) U.S. Cl. ............... 423/210; 423/237; 423/240; 423/241; 423/245.1; 423/245.3; 431/2; 431/5; 422/111; 422/168; 422/182; 422/183; 110/186

(58) Field of Classification Search ........... 423/210, 423/237, 245.1, 245.3, 240, 241; 422/111, 422/168, 182, 183; 110/186; 431/2, 5
See application file for complete search history.

(56) References Cited

U.S. PATENT DOCUMENTS 3,612,737 A * 10/1971 Sharan .................. 431/183

(Continued)

FOREIGN PATENT DOCUMENTS

EP        0 694 735 B1    1/1996

(Continued)

OTHER PUBLICATIONS

United Kingdom Search Report of Application No. GB 0417378.7; claims searched: All; Date of search: Dec. 21, 2004.

(Continued)

*Primary Examiner*—Timothy C Vanoy
(74) *Attorney, Agent, or Firm*—Mary K. Nicholes; Ira Lee Zebrak

(57) ABSTRACT

Apparatus is described for treating an effluent fluid stream from a semiconductor manufacturing process tool. The apparatus comprises a combustion chamber, means for heating the combustion chamber, and a nozzle for injecting the effluent stream into the combustion chamber. The apparatus is configured to enable a fuel and an oxidant to be selectively injected into the effluent stream as required to optimise the combustion conditions for a particular effluent stream. In one embodiment, a lance projecting into the nozzle selectively injects an oxidant into the effluent stream, and a sleeve surrounding the nozzle selectively injects a fuel into the effluent stream.

40 Claims, 3 Drawing Sheets

U.S. PATENT DOCUMENTS

| | | | |
|---|---|---|---|
| 5,123,364 A | | 6/1992 | Gitman et al. |
| 5,782,626 A | * | 7/1998 | Joos et al. ...................... 431/8 |
| 6,126,438 A | * | 10/2000 | Joshi et al. ................. 431/161 |
| 6,234,787 B1 | | 5/2001 | Endoh et al. |
| 6,530,977 B2 | * | 3/2003 | Seeley et al. ................. 95/149 |
| 6,635,228 B1 | | 10/2003 | Moore et al. |
| 6,660,223 B2 | * | 12/2003 | Edlinger ..................... 266/202 |
| 2001/0055555 A1 | | 12/2001 | Herman et al. |
| 2002/0192610 A1 | | 12/2002 | Takemura et al. |
| 2003/0157450 A1 | * | 8/2003 | Joshi et al. ................. 431/161 |

FOREIGN PATENT DOCUMENTS

| | | |
|---|---|---|
| EP | 0 802 370 B1 | 10/1997 |
| EP | 1 205 707 A2 | 5/2002 |
| EP | 1 291 069 A1 | 3/2003 |
| EP | 1 435 484 A2 | 7/2004 |

OTHER PUBLICATIONS

PCT Notification of Transmittal of the International Search Report and the Written Opinion of the International Searching Authority, or the Declaration of International Application No. PCT/GB2005/003033; Date of mailing: Oct. 4, 2005.

PCT International Search Report of International Application No. PCT/GB2005/003033; Date of mailing of the International Search Report: Oct. 4, 2005.

PCT Written Opinion of the International Searching Authority of International Application No. PCT/GB2005/003033; Date of mailing: Oct. 4, 2005.

* cited by examiner

GAS ABATEMENT

FIELD OF THE INVENTION

The present invention relates to gas abatement. The invention finds particular use in the abatement of gases exhaust from a process tool used in the semiconductor or flat panel display manufacturing industry.

BACKGROUND OF THE INVENTION $CF_4$, $C2F_6$, $NF_3$ and $SF_6$ are commonly used in the semiconductor and flat panel display manufacturing industry, for example, in dielectric layer etching and chamber cleaning. Following the manufacturing or cleaning process there is typically a residual PFC content in the effluent gas pumped from the process tool. PFCs are difficult to remove from the effluent gas, and their release into the environment is undesirable because they are known to have relatively high greenhouse activity.

The object of abatement is to convert the PFCs into one or more compounds that can be more conveniently disposed of, for example, by conventional scrubbing.

A known PFC abatement technique is to use combustion to remove the PFCs from the effluent gas. An example of this technique is described in EP-A-O 694 735, wherein a fuel gas is mixed with a nitrogen stream containing a PFC, and that gas stream mixture is conveyed into a combustion zone that is laterally surrounded by the exit surface of a foraminous gas burner. A fuel gas and air are simultaneously supplied to the foraminous burner to effect flameless combustion at the exit surface, with the amount of air passing through the foraminous burner being sufficient to consume not only the fuel supplied to the burner but also all the combustibles in the mixture injected into the combustion zone. Premixing the PFC with a fuel prior to the entry of the stream into the combustion zone was found to improve the efficiency of the PFC abatement. Good results were obtained with $C_2F_6$, $SF_6$ and $NF_3$, but the technique was not applicable to the abatement of $CF_4$ due to the maximum temperatures attainable within the combustion zone.

A modification of the above technique is described in EP-A-O 802 370, in which the gas stream mixture is conveyed into the combustion zone through a nozzle that is concentric with a lance that introduces oxygen into the mixture before it enters the combustion zone. Using this technique, good results were achieved for all PFC gases, including $CF_4$.

Recently, chamber cleaning has moved away from PFCs such as $C_2F_6$, $CF_4$ to plasma dissociated $NF_3$. Plasma dissociation of $NF_3$ produces high concentrations of extremely reactive atomic and molecular fluorine, which reacts with the debris in the process chamber to produce volatile fluorides, such as $SiF_4$. As only a small percentage of the fluorine reacts with the debris in the process chamber, the effluent stream from the process chamber contains large quantities of toxic and reactive fluorine, as well as significant quantities of unreacted $NF_3$. In view of this, the aforementioned techniques are not suitable for the abatement of such an effluent stream, as premixing a fuel into an effluent stream containing fluorine would result in a spontaneous exothermic reaction.

Furthermore, for large area semiconductor cleaning, the effluent fluid stream from the process chamber typically contains not only very high concentrations of PFCs such as $SF_6$ and/or $CF_4$ but also significant amounts of $O_2$ and $Cl_2$ as oxidants for achieving high chamber cleaning rates and high fractional utilisation of the cleaning gases. It is not possible to abate these mixtures to satisfactory levels using the techniques described above, as pre-mixing a hydrocarbon fuel with an effluent stream containing high concentrations of $O_2$ and $Cl_2$ produces a significant risk of flashback and combustion within the exhaust piping. In addition, the free radical quenching nature of $Cl_2$ further suppresses the reaction of the PFCs, leading to low abatement efficiencies.

More recently, dielectric layers are moving towards materials with lower dielectric constants ("low-k materials"). The precursors for these materials include 3MS (trimethylsilane $(CH_3)_3SiH$), 4MS (tetramethylsilane $(CH_3)_4Si$), DMDMOS (dimethyldimethoxysilane $(CH_3O)2Si(CH_3)_2$), TMCTS (tetramethylcyclotetrasiloxane $(CH_3(H)SiO)_4$) and OMCTS (octamethylcyclosiloxane $((CH_3)_2SiO)$), which are organosilanes with a significant carbon content. These chemicals can often be difficult to abate as they tend to be flammable in comparison to silane, which is pyrophoric. They are also much less reactive, and so precise combustion conditions are often needed to avoid the formation of products of incomplete combustion, which products can vary from solids and gels to foams.

It is an aim of at least the preferred embodiment of the present invention to seek to provide abatement apparatus that has a configuration which enables the apparatus to be used for a wide range of process gas mixtures.

SUMMARY OF THE INVENTION

In a first aspect, the present invention provides apparatus for treating an effluent fluid stream from a process tool, for example a semiconductor manufacturing process tool, the apparatus comprising a combustion chamber; a nozzle for injecting the effluent stream into the combustion chamber; means for selectively injecting first and second fluid streams into the effluent stream upstream from the combustion chamber; the injecting means comprising a lance projecting into the nozzle for conveying the first fluid stream into the effluent stream, and a sleeve extending about the nozzle for conveying the second fluid stream into the effluent stream; and control means for receiving data indicative of the composition of the effluent stream and for adjusting in response thereto at least one of (i) the rate of injection of at least one of the first and second fluid streams into the effluent stream and (ii) the composition of at least one of the first and second fluid streams.

In a second aspect, the present invention provides a method of treating an effluent fluid stream from a semiconductor manufacturing process tool, the method comprising the steps of providing a combustion chamber having a nozzle through which the effluent stream is injected into the combustion chamber, selectively injecting into the effluent stream a first fluid stream through a lance projecting into the nozzle, selectively injecting into the effluent stream a second fluid stream through a sleeve extending about the nozzle, and adjusting at least one of (i) the rate of injection of at least one of the first and second fluid streams into the effluent stream and (ii) the composition of at least one of the first and second fluid streams, in dependence on the composition of the effluent stream.

BRIEF DESCRIPTION OF THE DRAWINGS

By way of example, an embodiment of the invention will now be further described with reference to the accompanying drawings, in which.

DETAILED DESCRIPTION OF THE INVENTION

Figure 1:
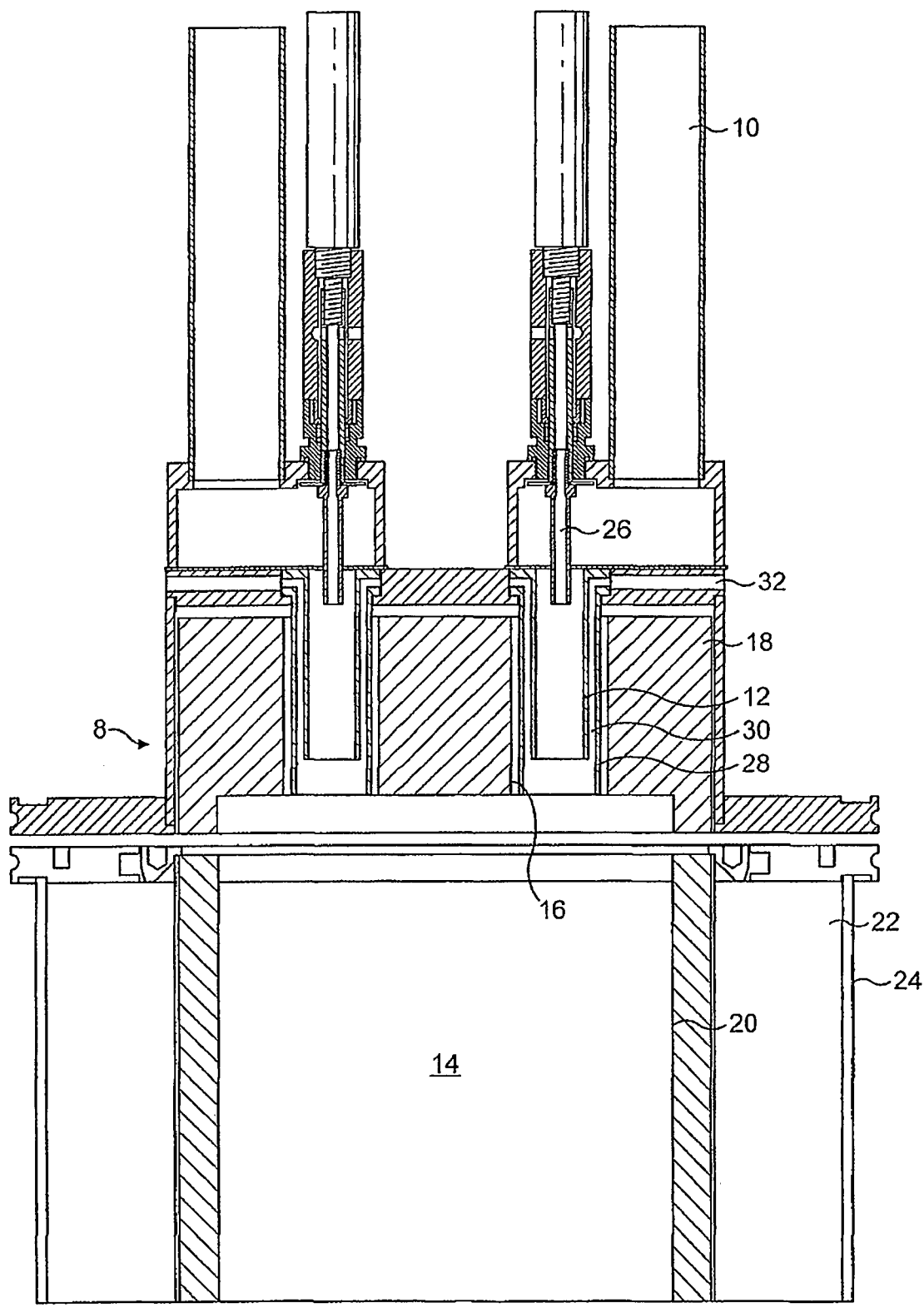
FIG. 1 illustrates schematically an apparatus for treating an effluent stream.

In a first aspect, the present invention provides apparatus for treating an effluent fluid stream from a process tool, for example a semiconductor manufacturing process tool, the apparatus comprising a combustion chamber; a nozzle for injecting the effluent stream into the combustion chamber; means for selectively injecting first and second fluid streams into the effluent stream upstream from the combustion chamber; the injecting means comprising a lance projecting into the nozzle for conveying the first fluid stream into the effluent stream, and a sleeve extending about the nozzle for conveying the second fluid stream into the effluent stream; and control means for receiving data indicative of the composition of the effluent stream and for adjusting in response thereto at least one of (i) the rate of injection of at least one of the first and second fluid streams into the effluent stream and (ii) the composition of at least one of the first and second fluid streams.

The apparatus is thus configured to enable the combustion conditions to be optimised for a particular effluent stream. For example, at least one of the first and second fluid streams may comprise a fuel, and/or at least one of the fluid streams may comprise an oxidant. In one example, the lance projecting into the nozzle can selectively inject an oxidant into the effluent stream, and a sleeve surrounding the nozzle can selectively inject a fuel into the effluent stream. Thus, a fuel, an oxidant or both a fuel and an oxidant can be injected into the effluent stream as required by simply switching on and off the fluid flows to the lance and the sleeve.

Where injection of both a fuel and an oxidant is required, this configuration enables the fuel and the oxidant to be supplied individually to the effluent stream, thereby avoiding pre-mixing of a potentially flammable combination of fuel and oxidant. Furthermore, the locations of the lance and the sleeve relative to the nozzle can enable good mixing of the oxidant, fuel, effluent gas and combustion by-products within the combustion chamber, promoting clean combustion.

By adjusting at least one of (i) the rate of injection of at least one of the first and second fluid streams into the effluent stream and (ii) the composition of at least one of the first and second fluid streams, in dependence on the composition of the effluent stream, the combustion of a component of the effluent stream can be optimised. This can enable the range of different effluent streams to be treated using a single inject stoichiometry. The process tool may supply the data indicative of the composition of the effluent stream. Alternatively, a gas sensor may be located within a conduit system for conveying the effluent stream to the nozzle, with this sensor being configured to supply the data.

The composition of the first and second fluid streams is preferably adjusted in dependence on the composition of the effluent stream. For example, the control means may be configured to control the injecting means to supply one of the fuel and the oxidant to the lance, and to supply the other of the fuel and the oxidant to the sleeve, when the received data indicates that the effluent stream contains ammonia. In a preferred embodiment, the control means is configured to control the injecting means to supply fuel at a rate of between 1 l/min and 10 l/min to one of the lance and the sleeve, and to supply oxidant at a rate of between 5 and 20 l/min to the other of the lance and the sleeve, when the received data indicates that the effluent stream contains between 0.5 l/min and 2.5 l/min of ammonia.

The control means is preferably configured to control the injecting means to supply oxidant to the lance, and to supply fuel to the sleeve, when the received data indicates that the effluent stream contains an organo-silane, such as 3MS or 4MS. In the preferred embodiment, the control means is configured to control the injecting means to supply fuel at a rate of between 1 l/min and 10 l/min to one of the lance and the sleeve, and to supply oxidant at a rate of between 5 and 20 l/min to the other of the lance and the sleeve, when the received data indicates that the effluent stream contains between 0.5 l/min and 2.5 l/min of organo-silane.

The injecting means preferably comprises means for selectively conveying one of the fuel and the oxidant from the source thereof into the effluent stream upstream from the nozzle.

The control means may be configured to control the injecting means to supply oxidant to the lance, and to supply fuel into the effluent stream upstream from the nozzle, when the received data indicates that the effluent stream contains a fluorine-containing component, for example a perfluorocarbon such as $CF_4$, $NF_3$ and $SF_6$. Alternatively, the control means may be configured to control the injecting means to supply oxidant into the effluent stream upstream from the nozzle, and to supply fuel to at least one of the lance and the sleeve, when the received data indicates that the effluent stream contains a fluorine-containing component. For example, the control means may be configured to control the injecting means to supply oxidant into the effluent stream upstream from the nozzle, and to supply fuel to both the lance and the sleeve, when the received data indicates that the effluent stream contains a fluorine-containing component and chlorine ($Cl_2$). In the preferred embodiment, the control means is configured to control the injecting means to supply fuel at a rate of between 5 l/min and 15 l/min to at least one of the lance and the sleeve, and to supply oxidant at a rate of between 5 and 20 l/min into the effluent stream upstream of the nozzle0, when the received data indicates that the effluent stream contains between 1 l/min and 5 l/min of a fluorine-containing component.

The injecting means preferably comprises variable flow control devices for varying the supply of the fuel and oxidant into the effluent stream upstream from the nozzle, the lance and the sleeve, the control means being arranged to selectively control the variable flow control devices in response to the received data.

The apparatus preferably comprises means for igniting the effluent stream and the fluids injected thereinto. In a preferred embodiment, the apparatus comprises a foraminous gas burner, the combustion chamber being laterally surrounded by the exit surface of the burner, the apparatus comprising means for supplying to the burner a mixture of a fuel and an oxidant.

In a second aspect, the present invention provides a method of treating an effluent fluid stream from a semiconductor manufacturing process tool, the method comprising the steps of providing a combustion chamber having a nozzle through which the effluent stream is injected into the combustion chamber, selectively injecting into the effluent stream a first fluid stream through a lance projecting into the nozzle, selectively injecting into the effluent stream a second fluid stream through a sleeve extending about the nozzle, and adjusting at least one of (i) the rate of injection of at least one of the first and second fluid streams into the effluent stream and (ii) the composition of at least one of the first and second fluid streams, in dependence on the composition of the effluent stream.

With reference first to FIG. 1, apparatus 8 for treating an effluent stream comprises one or more inlets 10 for receiving the effluent stream pumped from a semiconductor or flat panel display process tool by means of a vacuum pumping system. The effluent stream is conveyed from the inlet 10 to a nozzle 12, which injects the effluent stream into a combustion chamber 14. In the illustrated embodiment, the apparatus comprises four inlets 10, each for conveying an effluent fluid stream pumped from a respective tool by a respective vacuum pumping system. Alternatively, the effluent stream exhaust from a process tool may be "split" into two or more streams, each of which is conveyed to a respective inlet 10.

Each nozzle 12 is located within a respective bore 16 formed in a ceramic top plate 18, which defines the upper (as shown) surface of the combustion chamber 14. The combustion chamber 14 is bounded at the sides by the exit surface of a foraminous burner element 20 such as that described in EP-A-0 694 735. A plenum volume 22 is formed between the burner 20 and a cylindrical outer shell 24. A mixture of fuel gas, such as natural gas, or a hydrocarbon, and air is introduced into the plenum volume 22 via one or more inlet nozzles (not shown) so that, during use, the mixture of fuel gas and air will burn without visible flame at the exit surface of the burner 20. The lower surface (as shown) of the combustion chamber 14 is open to allow the combustion products to be output from the apparatus.

To enable the combustion conditions within the combustion chamber 14 to be optimised for a particular effluent stream, the apparatus includes means for selectively injecting first and second fluid streams into the effluent stream upstream from the combustion chamber 14. Injection of the first fluid stream is effected by means of lances 26, each of which is substantially concentrically positioned within a respective nozzle 12 to enable the first fluid stream to be injected directly into the effluent stream. Injection of the second fluid stream is effected by means of concentric nozzles, or sleeves, 28, each of which is located within a respective bore 16 and surrounds a respective nozzle 12 such that the nozzle outlet is located within the sleeve 28. An annular gap 30 defined between the outer surface of the nozzle 12 and the inner surface of the sleeve 28 allows the second fluid stream to be conveyed from an inlet port 32 into the fluid exhaust from the nozzle outlet, that is, either the effluent stream or a mixture of the effluent stream and the first fluid stream injected from the lance 26.

Figure 2:
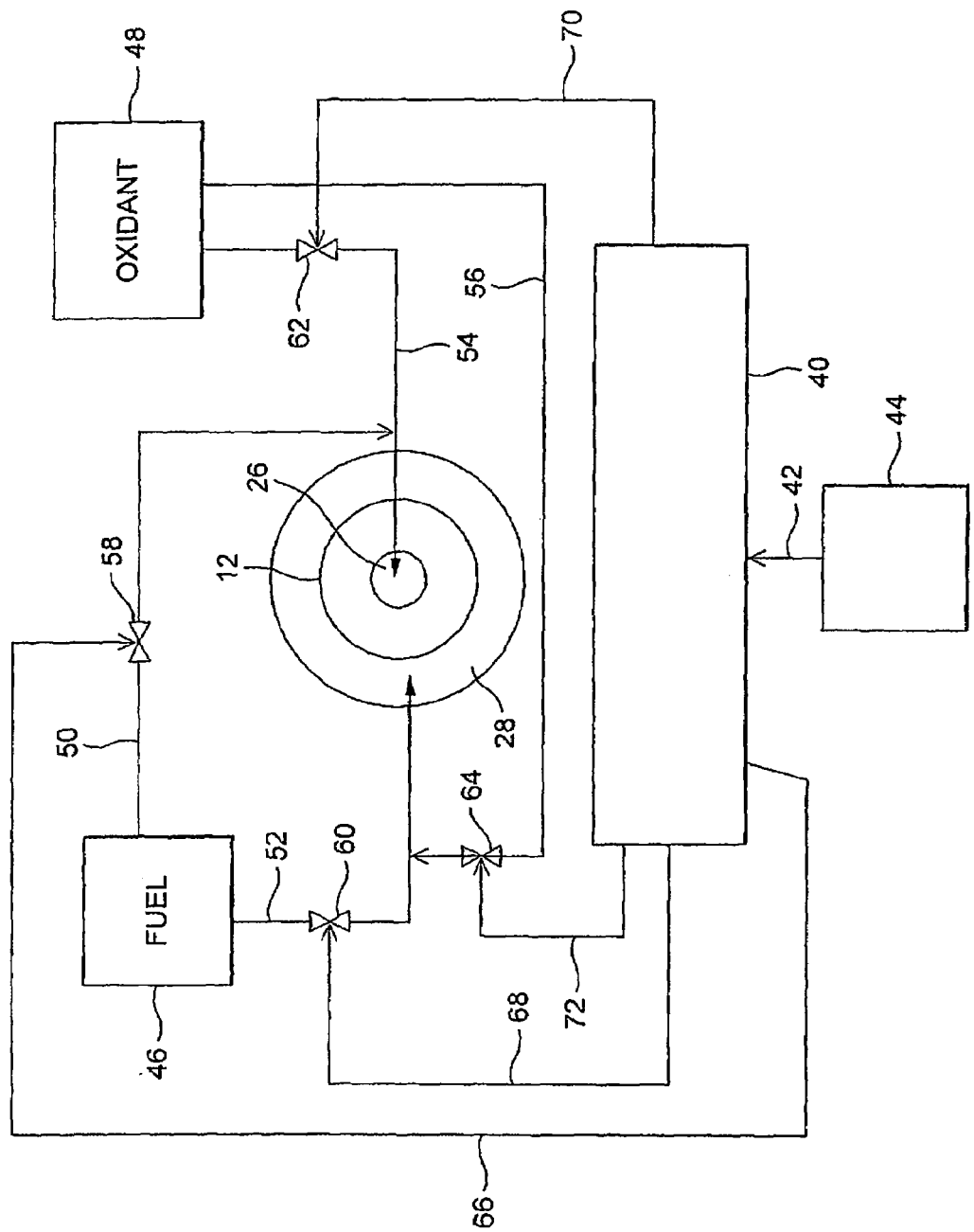
FIG. 2 illustrates schematically a first example of a control system for controlling the supply of a fuel and an oxidant to the apparatus of FIG. 1.

In preferred embodiments, each of the first and second fluid streams comprise one of a fuel and an oxidant. FIG. 2 illustrates a system for controlling the supply of fuel and oxidant to the apparatus 8. The control system comprises a controller 40 for receiving signals 42 containing data indicative of the composition and/or flow rate of the effluent stream, for example, when cleaning gases are supplied to a process chamber of the process tool. As illustrated in FIG. 2, the signals 42 may be received directly from the process tool 44. Alternatively, the signals 42 may be received from a host computer of a local area network of which the controller 40 and the controller of the process tool 44 forms part, the host computer being configured to receive information from the controller of the process tool 44 regarding the chemistry of the gases supplied to the process tool and to output the signals 42 to the controller 40 in response thereto. As another alternative, the signals 42 may be received from a gas sensor located between the outlet of the process chamber and the apparatus 8.

In response to the data contained in the received signals 42, the controller 40 may selectively control the relative amounts of fuel and oxidant supplied to the lance 26 and sleeve 28 of the apparatus 8. In this example, the system for selectively injecting the fluid streams into the effluent stream comprises a source 46 of a fuel, for example a hydrocarbon such as methane, and a source 48 of an oxidant, for example oxygen. Conduits 50, 52 and 54, 56 are associated with each source 46, 48 respectively for conveying the fuel and the oxidant to the lance 26 and the sleeve 28. A variable flow control device 58, 60, 62, 64 is provided within each conduit. These devices may be butterfly or other control valves each having a conductance that can be varied in dependence on, preferably in proportion to, a respective signal 66, 68, 70, 72 received from the controller 40. Alternatively, fixed orifice flow control devices may be used to control the flow of fuel and/or oxidant.

The controller 40 can control the conductance of the control valves so that controlled amounts of one of the fuel and the oxidant are injected into the lance 26 and the sleeve 28 as required to optimise the combustion of the effluent fluid stream. For example, in one arrangement for the combustive abatement of organo-silane low-k material, oxygen is injected via the lance 26 to give good clean combustion. The relative sizes and positions of the nozzle 12 and the lance 26 ensure good mixing of the oxygen, effluent gas and combustion by-products within the combustion chamber 14. If required, supplementary fuel can be injected via the sleeve 28. On the other hand, for the combustive abatement of $F_2/NF_3$ mixtures exhaust from the process tool, fuel is injected via the sleeve 28 to provide the necessary reducing species. Optionally, oxygen may be injected via the lance 26 to give clean combustion with low residual hydrocarbons and low carbon monoxide emissions.

Table 1 shows the results of various tests to abate ammonia from a gas stream comprising the ammonia in a nitrogen carrier gas, with varying amounts of methane ($CH_4$) as fuel gas and oxygen added to the gas stream. In the further set of data, 4MS was added to the ammonia. The figures are indicative of the emissions of the various gas species immediately downstream from the combustion chamber. The first set of data was obtained using an arrangement similar to that known from EP-A-0 802 370, in which the gas stream is pre-mixed fuel and conveyed into the combustion zone through a nozzle that is concentric with a lance that introduces oxygen into the mixture before it enters the combustion zone. The second to fourth sets of data were obtained using apparatus as described above, in which the lance 26 and sleeve 28 were used interchangeably to convey fuel gas and oxygen into the chamber 14.

TABLE 1

| $CH_4$ (l/min) | $O_2$ (l/min) | $NH_3$ (ppm) | CO (ppm) | NOx (ppm) | 4MS (ppm) |
|---|---|---|---|---|---|
| | | 1. 1 l/min $NH_3$ in 50 l/min $N_2$, premix (fuel) lance (oxygen) | | | |
| 0 | 0 | 2460 | 18 | 856 | |
| 4.5 | 11 | 43 | 24 | 647 | |
| | | 2. 1 l/min $NH_3$ in 50 l/min $N_2$, sleeve (fuel) lance (oxygen) | | | |
| 4.5 | 11 | 4 | 48 | 190 | |
| 4.5 | 16 | 8 | 38 | 172 | |
| | | 3. 1 l/min $NH_3$ in 50 l/min $N_2$, sleeve (oxygen) lance (fuel) | | | |
| 4.5 | 11 | 2 | 24 | 285 | |
| 4.5 | 16 | 3 | 41 | 359 | |

TABLE 1-continued

| $CH_4$ (l/min) | $O_2$ (l/min) | $NH_3$ (ppm) | CO (ppm) | NO$x$ (ppm) | 4MS (ppm) |
|---|---|---|---|---|---|
| 4. 1.7 l/min $NH_3$ + 1.1 l/min 4MS in 50 l/min $N_2$, sleeve (fuel) lance (oxygen) | | | | | |
| 0 | 0 | 49 | 336 | 67 | 227 |
| 4.5 | 11 | 22 | 207 | 187 | 1 |
| 4.5 | 13.5 | 11 | 96 | 227 | 1 |
| 4.5 | 16 | 6 | 62 | 239 | 0 |

As indicated by the above data, the levels of the ammonia emissions were significantly reduced for the tests performed using the apparatus illustrated in FIG. 1.

Figure 3:
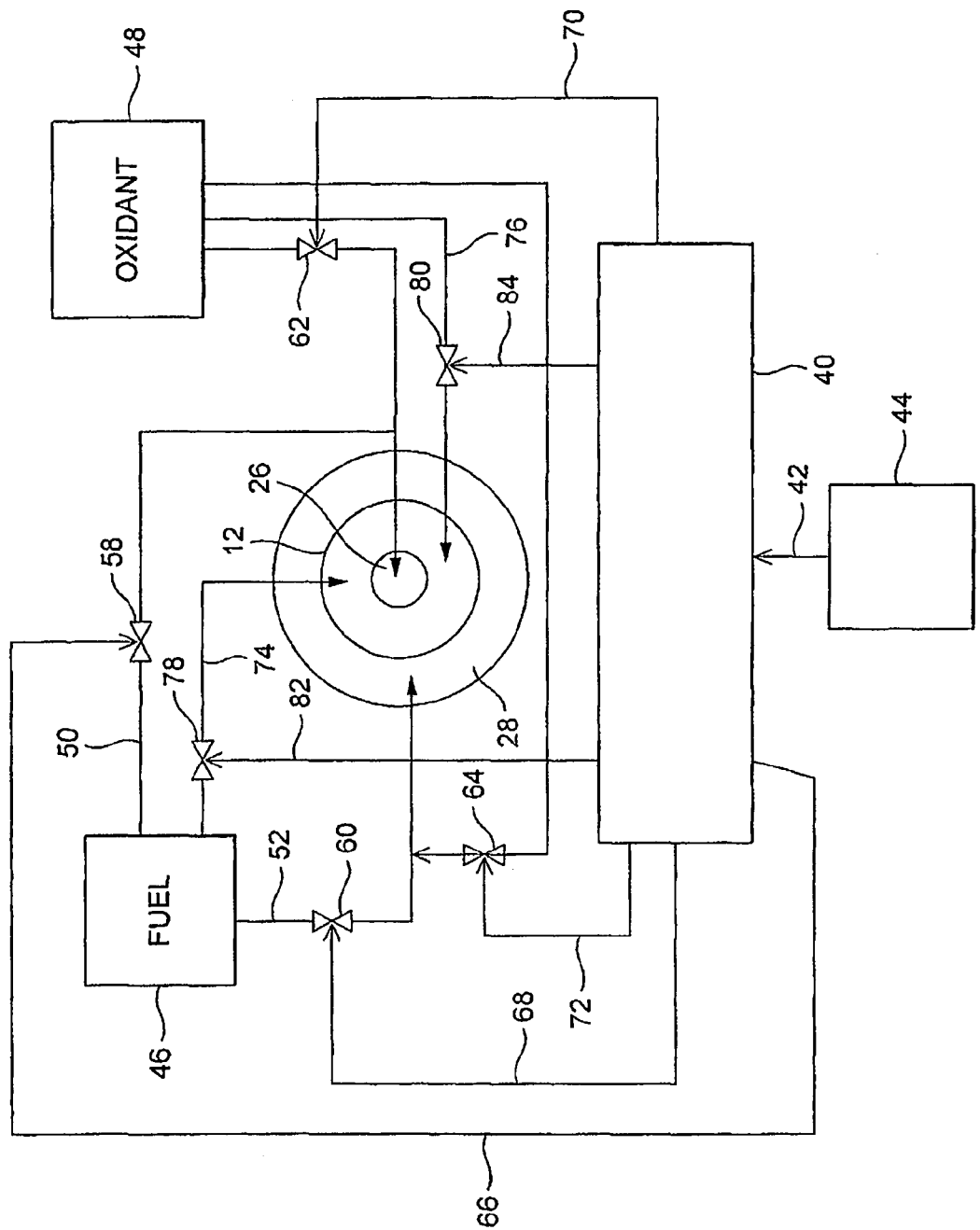
FIG. 3 illustrates schematically a second example of a control system for controlling the supply of a fuel and an oxidant to the apparatus of FIG. 1.

In a modification of the example described above, both the first and the second fluid streams may comprise a fuel. It has been found that by pre-mixing oxygen with the effluent gas upstream from the lance 26, and adding fuel via both the lance 26 and the sleeve 28, good abatement of very high concentrations of PFC gases in the presence of high concentrations of $Cl_2$ can be achieved. FIG. 3 illustrates schematically a modification of the control system of FIG. 2 for controlling the additional selective supply of fuel and oxidant into the nozzle 12 upstream from the lance 26. In this modification, the control system additionally comprises a conduit 74 for conveying fuel from the fuel source 46 to the nozzle 12, and a conduit 76 for conveying oxidant from the oxidant source 48 to the nozzle 12. Additional variable flow control devices 78, 80 are provided within conduits 74, 76 respectively, the conductance of which are controlled by signals 82, 84 output from the controller 40. Consequently, fuel may be conveyed to both the lance 26 and the sleeve 28, with oxidant being supplied to the nozzle 12 upstream from the lance 26, or conversely, oxidant may be conveyed to both the lance 26 and the sleeve 28, with fuel being supplied to the nozzle 12.

Table 2 shows the results of various tests to abate $SF_6$ from a gas stream comprising the $SF_6$ in a nitrogen carrier gas, again with varying amounts of methane ($CH_4$) as fuel gas and oxygen added to the gas stream, but also with varying amounts of $Cl_2$ added to the gas stream. As can be seen from this table, the % destruction rate (DRE) of the PFC was highest when the fuel was added via both the lance 26 and sleeve 28 and the gas stream was premixed with oxygen, and the negative effects of high flow rates of chlorine on PFC abatement, which have been previously encountered using the arrangement of EP-A-O 802 370, can be reversed by using such a configuration.

TABLE 2

3 l/min $SF_6$ in 50 l/min $N_2$, on one inlet of a 4 inlet combustor

| $CH_4$ | | $O_2$ | | $Cl_2$ | |
|---|---|---|---|---|---|
| flow (l/min) | position | flow (l/min) | Position | flow (l/min) | $SF_6$ DRE |
| 6.3 | lance | 11 | Premix | 0 | 94.1% |
| 8.9 | premix | 16 | Lance | 0 | 99.2% |
| 8.9 | lance + sleeve | 16 | Premix | 0 | 99.9% |
| 6.3 | lance | 11 | Premix | 5 | 88.6% |
| 8.9 | premix | 16 | Lance | 5 | 95.3% |
| 8.9 | lance + sleeve | 16 | Premix | 5 | 99.6% |

Table 3 shows the results of similar tests performed on a gas stream containing both $SF_6$ and $CF_4$.

3 l/min $SF_6$ and 2 l/min $CF_4$ in 50 l/min $N_2$, on one inlet of a 4 inlet combustor $CH_4$ on lance and sleeve, $O_2$ premix

| $N_2$ | $Cl_2$ | DRE | |
|---|---|---|---|
| (l/min) | (l/min) | $SF_6$ | $CF_4$ |
| 50 | 0 | 100% | 79.5% |
| 40 | 0 | 100% | 95.7% |
| 30 | 0 | 100% | 96.3% |
| 50 | 5 | 99.9% | 68.9% |
| 40 | 5 | 99.9% | 89.1% |
| 30 | 5 | 100% | 94.6% |

The table indicates that this abatement technique extends to very high flow rates, and makes possible abatement of $CF_4$ to commercially significant levels of performance.

While the foregoing description and drawings represent the preferred embodiments of the present invention, it will be apparent to those skilled in the art that various changes and modifications may be made therein without departing from the true spirit and scope of the present invention.

We claim:

1. An apparatus for treating an effluent gas stream from a semiconductor manufacturing process tool comprising: a combustion chamber; a nozzle for injecting the effluent stream into the combustion chamber; means for selectively injecting first and second fluid streams into the effluent stream upstream from the combustion chamber; the injecting means comprising a lance projecting into the nozzle for conveying the first fluid stream into the effluent stream, and a sleeve extending about the nozzle for conveying the second fluid stream into the effluent stream; and control means for receiving data indicative of the composition of the effluent stream and for adjusting in response thereto at least one of (i) the rate of injection of at least one of the first and second fluid streams into the effluent stream and (ii) the composition of at least one of the first and second fluid streams.

2. The apparatus according to claim 1 wherein the injecting means comprises a source of a fuel, a source of an oxidant, means for selectively conveying one of the fuel and the oxidant from the source thereof to the lance as the first fluid stream, and means for selectively conveying one of the fuel and the oxidant from the source thereof to the sleeve as the second fluid stream, the control means being configured to control the selection of the fuel and the oxidant in dependence on the composition of the effluent stream.

3. The apparatus according to claim 2 wherein the injecting means comprises variable flow control devices for varying the supply of the fuel and oxidant to the sleeve and the lance, the control means being arranged to selectively control the variable flow control devices in response to the received data.

4. The apparatus according to claim 2 wherein the control means is configured to control the injecting means to supply one of the fuel and the oxidant to the lance, and to supply the other of the fuel and the oxidant to the sleeve, when the received data indicates that the effluent stream contains ammonia.

5. The apparatus according to claim 4 wherein the control means is configured to control the injecting means to supply fuel at a rate of between 1 l/min and 10 l/min to one of the lance and the sleeve, and to supply oxidant at a rate of between 5 and 20 l/min to the other of the lance and the sleeve, when the received data indicates that the effluent stream contains between 0.5 l/min and 2.5 l/min of ammonia.

6. The apparatus according to claim 2 wherein the control means is configured to control the injecting means to supply oxidant to the lance, and to supply fuel to the sleeve, when the received data indicates that the effluent stream contains an organo-silane.

7. The apparatus according to claim 6 wherein the control means is configured to control the injecting means to supply fuel at a rate of between 1 l/min and 10 l/min to one of the lance and the sleeve, and to supply oxidant at a rate of between 5 and 20 l/min to the other of the lance and the sleeve, when the received data indicates that the effluent stream contains between 0.5 l/min and 2.5 l/min of organo-silane.

8. The apparatus according to claim 2 wherein the injecting means comprises means for selectively conveying one of the fuel and the oxidant from the source thereof into the effluent stream upstream from the nozzle.

9. The apparatus according to claim 8 wherein the injecting means comprises variable flow control devices for varying the supply of the fuel and oxidant into the effluent stream upstream from the nozzle, the control means being arranged to selectively control the variable flow control devices in response to the received data.

10. The apparatus according to claim 8 wherein the control means is configured to control the injecting means to supply oxidant to the lance, and to supply fuel into the effluent stream upstream from the nozzle, when the received data indicates that the effluent stream contains a fluorine-containing component.

11. The apparatus according to claim 8 wherein the control means is configured to control the injecting means to supply oxidant into the effluent stream upstream from the nozzle, and to supply fuel to at least one of the lance and the sleeve, when the received data indicates that the effluent stream contains a fluorine-containing component.

12. The apparatus according to claim 11 wherein the control means is configured to control the injecting means to supply oxidant into the effluent stream upstream from the nozzle, and to supply fuel to both the lance and the sleeve, when the received data indicates that the effluent stream contains a fluorine-containing component and chlorine ($Cl_2$).

13. The apparatus according to claim 11 wherein the control means is configured to control the injecting means to supply fuel at a rate of between 5 l/min and 15 l/min to at least one of the lance and the sleeve, and to supply oxidant at a rate of between 5 and 20 l/min into the effluent stream upstream of the nozzle, when the received data indicates that the effluent stream contains between 1 l/min and 5 l/min of a fluorine-containing component.

14. The apparatus according to claim 10 wherein the fluorine-containing component comprises a perfluorocarbon.

15. The apparatus according to claim 2 wherein the fuel comprises a hydrocarbon.

16. The apparatus according to claim 2 wherein the oxidant comprises oxygen.

17. The apparatus according to claim 1 wherein the nozzle extends about the lance.

18. The apparatus according to claim 1 wherein the nozzle is substantially concentric with the lance.

19. The apparatus according to claim 1 wherein the sleeve is substantially concentric with the nozzle.

20. The apparatus according to claim 1 wherein the nozzle terminates within the sleeve.

21. The apparatus according to claim 1 wherein the combustion chamber is laterally surrounded by the exit surface of a foraminous gas burner, and wherein the apparatus further comprises means for supplying to the burner a mixture of a fuel and an oxidant.

22. A method of treating an effluent fluid stream from a semiconductor manufacturing process tool comprising the steps of: providing a combustion chamber having a nozzle through which the effluent stream is injected into the combustion chamber; selectively injecting into the effluent stream a first fluid stream through a lance projecting into the nozzle; selectively injecting into the effluent stream a second fluid stream through a sleeve extending about the nozzle; and adjusting at least one of (i) the rate of injection of at least one of the first and second fluid streams into the effluent stream and (ii) the composition of at least one of the first and second fluid streams, in dependence on the composition of the effluent stream.

23. The method according to claim 22 wherein one of a fuel and an oxidant is selectively conveyed to the lance as the first fluid stream, and one of the fuel and the oxidant is selectively conveyed to the sleeve as the second fluid stream, the selection of the fuel and oxidant being dependent on the composition of the effluent stream.

24. The method according to claim 22 wherein one of the fuel and the oxidant is supplied to the lance, and the other of the fuel and the oxidant is supplied to the sleeve, when the effluent stream contains ammonia.

25. The method according to claim 24 wherein the fuel is supplied at a rate of between 1 l/min and 10 l/min to one of the lance and the sleeve, and the oxidant is supplied at a rate of between 5 and 20 l/min to the other of the lance and the sleeve, when the effluent stream contains between 0.5 l/min and 2.5 l/min of ammonia.

26. The method according to claim 23 wherein oxidant is supplied to the lance, and fuel is supplied to the sleeve, when the effluent stream contains an organo-silane.

27. The method according to claim 26 wherein the fuel is supplied at a rate of between 1 l/min and 10 l/min to one of the lance and the sleeve, and the oxidant is supplied at a rate of between 5 and 20 l/min to the other of the lance and the sleeve, when the effluent stream contains between 0.5 l/min and 2.5 l/min of organo-silane.

28. The method according to claim 23 wherein one of the fuel and the oxidant is conveyed into the effluent stream upstream from the nozzle in dependence on the composition of the effluent stream.

29. The method according to claim 28 wherein the oxidant is supplied to the lance, and the fuel is conveyed into the effluent stream upstream from the nozzle, when the effluent stream contains a fluorine-containing component.

30. The method according to claim 28 wherein the oxidant is conveyed into the effluent stream upstream from the nozzle, and the fuel is supplied to at least one of the lance and the sleeve, when the effluent stream contains a fluorine-containing component.

31. The method according to claim 30 wherein oxidant is conveyed into the effluent stream upstream from the nozzle, and fuel is supplied to both the lance and the sleeve, when the effluent stream contains a fluorine-containing component and chlorine ($Cl_2$).

32. The method according to claim 30 wherein the fuel is supplied at a rate of between 5 l/min and 15 l/min to at least one of the lance and the sleeve, and oxidant is supplied at a rate of between 5 and 20 l/min into the effluent stream upstream of the nozzle, when the effluent stream contains between 1 l/min and 5 l/min of a fluorine-containing component.

33. The method according to claim 29 wherein the fluorine-containing component comprises a perfluorocarbon.

34. The method according to claim 23 wherein the fuel comprises a hydrocarbon.

35. The method according to claim 23 wherein the oxidant comprises oxygen.

36. The method according to claim 22 wherein the combustion chamber is laterally surrounded by the exit surface of a foraminous gas burner, and wherein a mixture of a fuel and an oxidant is supplied to the burner.

37. The apparatus according to claim 10 wherein the fluorine-containing component comprises a perfluorocarbon selected from the group consisting of $CF_4$, $NF_3$ and $SF_6$ and mixtures thereof.

38. The apparatus as in claim 15 wherein the hydrocarbon comprises methane.

39. The method according to claim 29 wherein the fluorine-containing component comprises a perfluorocarbon selected from the group consisting of $CF_4$, $NF_3$ and $SF_6$ and mixtures thereof.

40. The method as in claim 34 wherein the hydrocarbon comprises methane.

* * * * *